United States Patent [19]
Mc Candless

[11] Patent Number: 5,810,130
[45] Date of Patent: Sep. 22, 1998

[54] SUSPENSION DAMPER WITH REBOUND CUT-OFF

[75] Inventor: John Gregg Mc Candless, Miamisburg, Ohio

[73] Assignee: General Motors Corporation, Detroit, Mich.

[21] Appl. No.: 818,021

[22] Filed: Mar. 14, 1997

[51] Int. Cl.[6] ........................................... F16F 9/00
[52] U.S. Cl. ................. 188/322.22; 188/322.15
[58] Field of Search ..................... 188/281, 284, 188/287, 315.1, 322.15–322.19, 322.22; 267/64.15, 64.23

[56] References Cited

U.S. PATENT DOCUMENTS

| | | | |
|---|---|---|---|
| 2,379,750 | 7/1945 | Rossman | 188/284 |
| 2,717,058 | 9/1955 | Brundrett . | |
| 3,007,550 | 11/1961 | Long, Jr. . | |
| 3,621,949 | 11/1971 | Watson | 188/284 |
| 3,804,217 | 4/1974 | Keijzer et al. | 188/322.17 |
| 3,837,445 | 9/1974 | Pievle | 188/322.17 |
| 4,185,721 | 1/1980 | Karklins et al. . | |
| 4,245,825 | 1/1981 | Ohtomo et al. | 188/315 |
| 4,342,447 | 8/1982 | Marx | 188/322.17 |
| 4,397,452 | 8/1983 | Fouts | 267/220 |
| 4,502,575 | 3/1985 | Fukushima et al. | 188/282 |
| 4,838,393 | 6/1989 | Mourray et al. | 188/284 |
| 4,852,703 | 8/1989 | Nishimoto | 188/284 |
| 4,989,701 | 2/1991 | Yamaoka et al. | 188/322.17 |
| 5,024,301 | 6/1991 | Cook | 188/284 |
| 5,277,284 | 1/1994 | Piadel et al. | 188/322.17 |
| 5,580,034 | 12/1996 | Cheng | 188/322.17 |

FOREIGN PATENT DOCUMENTS

| | | |
|---|---|---|
| 887191 | 1/1962 | United Kingdom . |
| 2039664 | 8/1980 | United Kingdom . |
| 2107821 | 5/1983 | United Kingdom . |

OTHER PUBLICATIONS

Reimpell J., "Fahrwektechnik:Stobdampfer" Wurzburg: Vogel–Buchverlag, 1983 Edition pp. 5, 30–31, 94–105.

Primary Examiner—Robert J. Oberleitner
Assistant Examiner—Chris Schwartz
Attorney, Agent, or Firm—Jeffrey A. Sedlar

[57] ABSTRACT

A suspension system damper includes a hydraulic rebound cut-off feature without unduly limiting active travel. A spring separates a rebound cut-off piston from the rod guide. The rebound cut-off piston has an oversized center hole. The outer periphery of the rebound cut-off piston is sized for a close slip-fit within the tube with a number of small slots acting as restrictive and tunable flow control features when the system enters a cut-off mode. When the top of the damping piston assembly comes into contact with the rebound cut-off piston, the cut-off mode is entered. Hydraulic flow is cut-off by blocking fluid flow through the center hole. This generates hydraulic loads on the piston rod by virtue of the high pressure generated between the rebound cut-off piston and the rod guide. Fluid is restricted to exiting the rebound cut-off region via the small slots in the outer periphery of the damping piston assembly. As fluid flow is restricted, the extension travel of the damper is slowed and is positively limited by mechanical engagement of the rebound cut-off piston with the rod guide assembly. Upon reaching full extension and transitioning to a compression stroke, the damping piston assembly separates from the rebound cut-off piston permitting substantially free flow through the center hole so that the rebound cut-off feature does not generate loads at the commencement of compression directed travel.

8 Claims, 4 Drawing Sheets

SUSPENSION DAMPER WITH REBOUND CUT-OFF

TECHNICAL FIELD

The present invention relates to a suspension damper with rebound cut-off and more particularly, to a suspension damper with a hydraulic rebound cut-off feature that significantly boosts damping force near the full rebound travel limit of the damper to stop extension directed movement.

BACKGROUND OF THE INVENTION

A damper operates in vehicle suspensions as a damping device controlling the sprung (body), and unsprung (wheels), masses of a vehicle by reducing loads or vertical accelerations normally transmitted from the wheels to the body. Damping is accomplished by converting kinetic energy into thermal energy and dissipating the heat. Conventionally, hydraulic dampers include a piston with a connected piston rod slidably carried in a fluid-filled tube and separating the tube into extension and compression chambers. A rod guide at the top end of the tube closes the extension chamber and slidably engages the piston rod. With a suspension damper, a need for a rebound stop arises when the suspension's operating frequency and the loads generated from vehicle use require increased damping near full extension. A damper rebound stop feature is used in vehicle suspensions when the damper serves as the suspension system stop in full extension.

Mechanical rebound stops that are fixed to the piston rod and engageable with the rod guide are known to provide a means of limiting the maximum extension travel of the piston rod from the damper. A typical mechanical rebound stop is generally equipped with a resilient bumper made of material such as rubber or urethane. The bumper is designed to cushion the engagement of the damping piston with the rod guide at the end of damper travel in the extension direction. This type of a mechanical stop tends to result in somewhat of an abrupt means of limiting travel during rebound. It has also been found that in severe applications, a resilient bumper material may undesirably experience heat degradation when the bumper absorbs the entire rebound stop load.

Providing a hydraulic rebound cut-off type stop with a shock absorber form of damper is also known. Such a device is disclosed in U.S. Pat. No. 3,621,949 which issued Nov. 23, 1971. That hydraulic rebound stop device uses an axial rod flow path communicating fluid between the extension and compression chambers and operates as an additional damping flow path with the typical piston valved orifices. When the piston approaches full extension, the axial rod flow path is closed by the rod guide, significantly increasing damping force and slowing extension directed travel. This prior art device undesirably necessitates changes to the rod guide to prevent blow-by of hydraulic fluid caused by high pressure which builds in the lower entrance segment of the rod guide.

Yet another type of known hydraulic rebound cut-off stop utilizes a rebound cut-off piston in conjunction with the damping piston. Such a device is described in U.S. Pat. No. 3,007,550 which issued Nov. 7, 1961. According to this prior art design, the rebound cut-off piston coacts with the damping piston to effect a substantial entrapment of fluid in the extension chamber of the shock absorber as the damping piston approaches full rebound. However, this device effects an increase in resistance to movement only when the velocity of movement of the damping piston exceeds a certain predetermined value. In so doing, a rather complicated assembly is used that undesirably detracts from active length of the damper.

Particularly with monotube design dampers, maximizing active length is critical. This is because a typical monotube damper carries a gas cup that separates out a gas chamber within the single tube of the device. The gas chamber is expansible and contractible to account for the changing volume of space occupied by the rod entering and exiting the tube. Presence of the gas chamber minimizes the amount of active length that can be utilized by other features such as the rebound cut-off device. Therefore, a short-length rebound stop that does not unduly reduce active damper length is preferred.

SUMMARY OF THE INVENTION

According to the present invention a robust, economic, uncomplicated and relatively short-length rebound cut-off feature of a suspension damper is provided. An aspect of the present invention encompasses providing a means of significantly increasing damping pressure as the damper extends into full rebound, thereby furnishing a means of reducing the abruptness otherwise experienced with a purely mechanical rebound stop, while concurrently maximizing active travel length.

According to this aspect, a suspension system's damper includes a cylinder tube slidably and sealingly carrying a piston that is fixedly engaged to a piston rod. The piston separates the cylinder tube into compression and rebound chambers and includes generally conventional damping valves with flow between the compression and rebound chambers being directed through the damping valves. A spring seat is provided as part of the rod guide assembly, preferably as part of the flask, and a spring separates a rebound cut-off piston from the spring seat. The rebound cut-off piston includes an oversized center hole, with the piston rod traveling through the center hole. Sufficient clearance is provided by the center hole to permit a substantially unrestricted fluid exchange through the clearance when the damping piston is moved away from the rebound cut-off piston. The outer periphery of the rebound cut-off piston is sized for a close slip-fit within the tube and includes a number of small slots acting as restrictive and tunable flow control features when the system enters a cut-off mode. Advantageously, the present invention is amenable to incorporating an optional resilient bumper in the design which avoids noise generated by metal-to-metal contact. The bumper is carried between the damping piston and the rebound cut-off piston and can be optionally fastened to either, or pressed onto the rod.

When the top of the damping piston assembly comes into contact with the rebound cut-off piston with or without an interposed bumper, a cut-off mode is entered. Upon entrance into the cut-off mode, hydraulic flow is cut-off by blocking fluid flow through the center hole. This transfers hydraulically developed loads to the piston rod by virtue of the high pressure generated between the rebound cut-off piston and the rod guide. Fluid is restricted to exiting the rebound cut-off region via the small slots in the outer periphery of the rebound cut-off piston. As fluid flow is restricted, the extension travel of the damper is slowed and is positively limited by mechanical engagement of the rebound cut-off piston with the rod guide assembly.

Upon reaching full extension and transitioning to a compression stroke, the damping piston assembly separates from the rebound cut-off piston permitting substantially free fluid flow through the center hole so that the rebound cut-off feature does not generate loads at the commencement of compression directed travel. It has been found advantageous in the performance of a damper to minimized rebound cut-off generated loads once the piston travel has transitioned to the compression direction because of vehicle ride benefits. For example, when a road input causes the wheel to suddenly drop resulting in full extension, followed by rapid compression, added damping isn't preferred after transitioning to a compression stroke, since an increased vertical load on the vehicle would result.

By selectively sizing the small slots through the outer periphery of the rebound cut-off piston, the pressure rise rate can be advantageously tailored to the specific application. In addition, by varying the length and stiffness of the spring, entry into the rebound cut-off mode can be accelerated or delayed. These benefits are achieved in an uncomplicated manner and contribute to obtaining more progressive loads upon entry into a rebound cut-off mode.

DETAILED DESCRIPTION OF THE PRESENTLY PREFERRED EMBODIMENT

Figure 1:
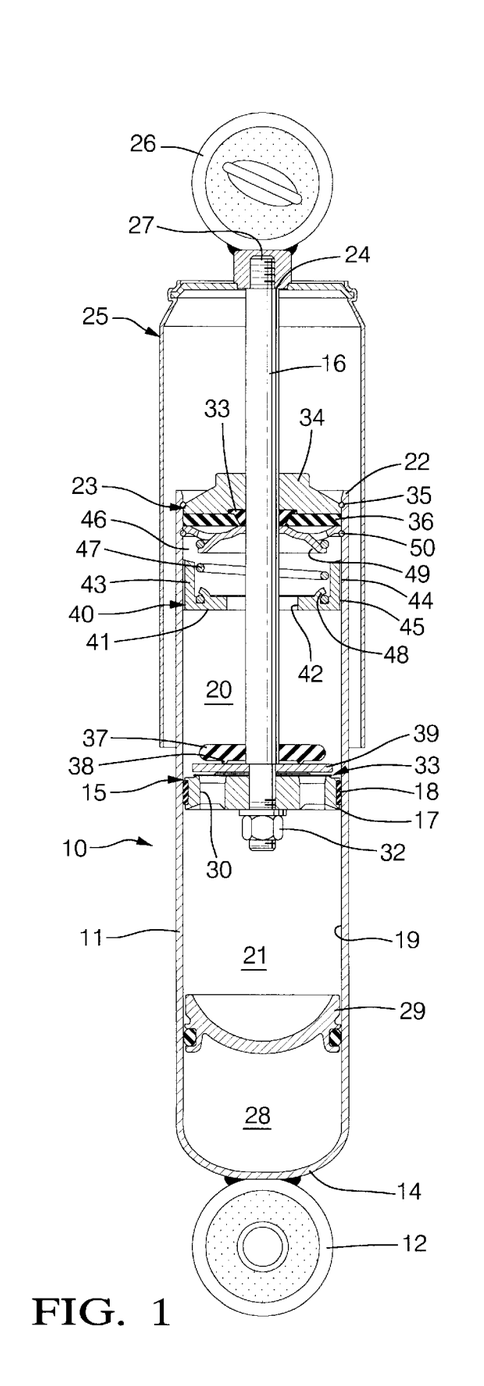
FIG. 1 is a fragmentary cross-sectional view of a suspension damper illustrating features of the present invention.

Referring to the drawings, illustrated in FIG. 1 is a damper for a vehicle suspension embodied as shock absorber 10. At the outset it will be apparent to one skilled in the art that the present invention, though disclosed through monotube type shock absorber embodiments, is not so limited in use and will lend itself to application in multiple tube shock absorbers and in other types of suspension dampers. Application of the present invention in monotube dampers is particularly expedient however, since active travel length is at a premium.

With specificity, shock absorber 10 includes an elongated cylindrical tube 11 having an attachment fitting 12 secured thereto for connection to a wheel assembly (not illustrated), as the unsprung mass in a vehicle's suspension system. The tube 11 is closed at its lower end by a base cup 14 which is secured thereto through a conventional means such as welding, or is formed as an integral part thereof. Tube 11 contains a quantity of oil (no reference number), that is used as a damping medium in the shock absorber 10. The damping piston assembly 15 is slidably mounted for reciprocal movement in the tube 11 and is affixed to the piston rod 16. Damping piston assembly 15 includes a steel piston body 17 which carries a band of low friction material 18 sealingly and slidably engaging the inner wall 19 of tube 11. Damping piston assembly 15 hydraulically separates the interior of tube 11 into two expansible and contractible working chambers designated as extension chamber 20 and compression chamber 21.

The upper end 22 of tube 11 is in general, provided with fastening devices such as snap rings and grooves (or is otherwise formed) to securely carry a rod guide assembly 23. The piston rod 16 extends through extension chamber 20 and rod guide assembly 23 exiting the tube 11. Piston rod 16 includes an annular shoulder 24 that carries a generally cylindrical dust tube assembly 25 which extends down over the tube 11. An attachment fitting 26 is threaded onto, or optionally otherwise suitably engaged with the end 27 of piston rod 16. Attachment fitting 26 is provided for attachment to the body of a vehicle (not illustrated), as the sprung mass of the suspension system. Therefore, in response to relative movement between the wheel assembly and the vehicle, the damping piston assembly 15 reciprocally moves within tube 11.

The oil that is carried in tube 11 provides a damping medium for the shock absorber 10. During a compression stroke, as the damping piston assembly 15 slides downward in the tube 11, an increasing volumetric amount of the piston rod 16 enters the tube 11 through the rod guide assembly 23. Therefore, a means of accommodating this increased volume within the shock absorber 10 must be provided. Accordingly, a compressible gas charge is carried within compensation chamber 28 which is separated from the compression chamber 21 by a reciprocal gas cup assembly 29. As the increasing amount of the piston rod 16 enters the tube 11 during a compression stroke of the shock absorber 10, the gas within compensation chamber 28 is compressed as the gas cup assembly 29 slides downward in response to displacement of the noncompressible hydraulic fluid carried within compression chamber 21 and extension chamber 20.

In greater detail, the damping piston assembly 15 includes the piston body 17 which is an annular element having a number of longitudinally extending openings designated in the aggregate as 30. The openings 30 are open to the compression chamber 21. The piston body 17 includes an opening that receives a turned down section of piston rod 16 and is secured thereon by a nut 32 that threadedly engages piston rod 16. A valve assembly 33 of the bi-directional monodisc type is carried about piston rod 16 against piston body 17 and normally closes the openings 30. The valve assembly 33 includes a disc stop 39 that is rigidly connected to the piston body 17. During compression directed travel of the damping piston assembly 15, the valve assembly 33 permits restricted flow from the compression chamber 21 to the extension chamber 20 and is tuned to provide a selected damping rate. During extension directed travel of the damping piston assembly 15, the valve assembly 33 permits restricted flow from the extension chamber 20 to the compression chamber 21 and is tuned to provide a selected damping rate, that may be different than the damping rate provided during compression.

Referring to the end 22 of the tube 11, the rod guide assembly 23 includes a metal rod guide body 34 surrounding piston rod 16. The rod guide body 34 is fixed in the end 22 of tube 11 by a snap ring 35 and provides lateral support and a bearing surface for the piston rod 16. An annular static seal 36 is carried against the rod guide body 34 and is securely sealed therewith, and with the inner wall 19 of tube 11. Dynamic seal 33 is carried about the piston rod 16 providing a fluid tight closure at the rod guide assembly 23, and is positioned between the rod guide body 34 and the static seal 36. A flask 49 is fixed against static seal 36 and is maintained in position by a snap ring 50 that engages tube 11.

An integral hydraulic rebound cut-off feature is carried by the damping piston assembly 15 and the rod guide assembly 23. The damping piston assembly 15 carries a rebound cushioning element designated as bumper 37 which comprises an annular resilient body having a plurality of rounded protuberances designated as knobs 38 positioned against disc stop 39. Optionally, an annular rib can be used in place of a plurality of knobs. The piston rod 16 passes through the bumper 37. The rod guide assembly 23 carries rebound cut-off piston 40 which separates out a rebound cut-off region 46 from the extension chamber 20. Rebound cut-off piston 40 includes an annular base wall 41 with an oversized center hole 42 through which piston rod 16 passes. Rebound cut-off piston 40 also includes an upward extending cylindrical wall 43 which is sized for a close slip-fit within the tube 11 against the inner wall 19. The outer periphery 44 of cylindrical wall 43 includes a number of small slots that extend longitudinally and are designated in the aggregate as 45. The rebound cut-off piston 40 is suspended by spring 47, which is fixed in clip 48 formed at the junction of base wall 41 and cylindrical wall 43. The opposite end of spring 47 is fixed to flask 49. The flask 49 is formed as a metal stamping with downward extending arms 51 for holding the spring 47 and providing a spring seat.

Figure 2:
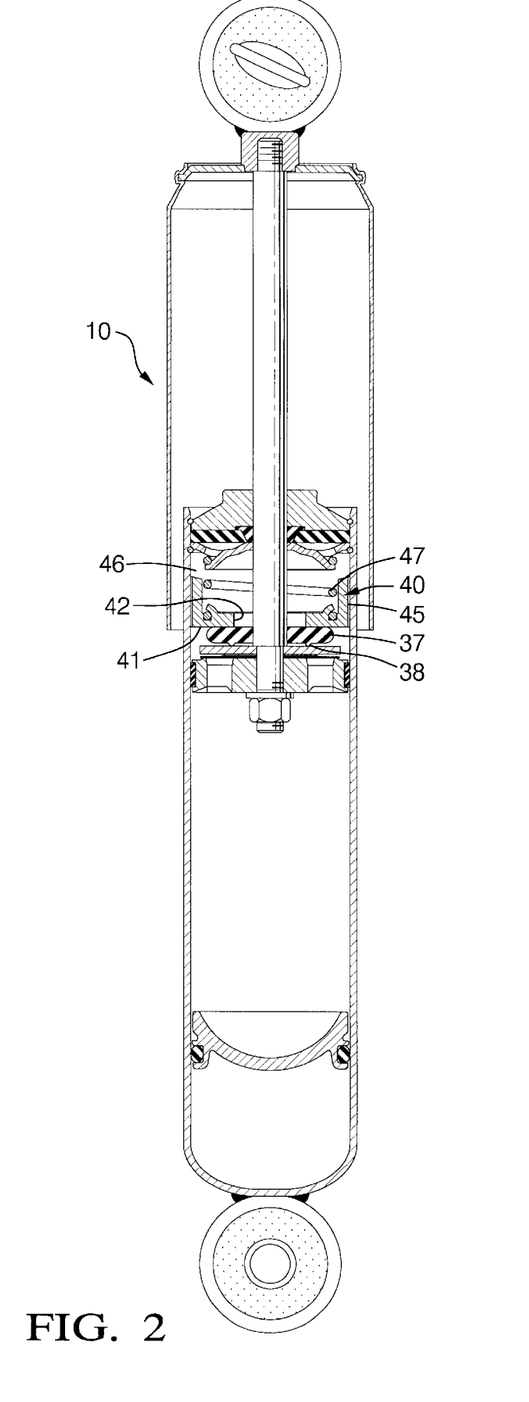
FIG. 2 is a fragmentary cross-sectional view of the suspension damper of FIG. 1 detailing entry into the rebound cut-off mode.

The center hole 42 of rebound cut-off piston 40 is sized with enough clearance away from piston rod 16 to permit a substantially unrestricted flow of fluid between the rebound cut-off region 46 and the extension chamber 20 when the damping piston assembly 15 is positioned away from the rebound cut-off piston 40, as shown in FIG. 1. Referring to FIG. 2, the shock absorber 10 is shown entering a rebound cut-off mode during an extension stroke. Initially, the bumper 37 contacts the base wall 41 of rebound cut-off piston 40. Since the rebound cut-off piston 40 is moveable against the bias of spring 47, the knobs 38 provide a soft engagement compressing under a relatively light load and facilitating a secure sealing off of the central hole 42 and providing a more progressive entry into the rebound cut-off mode while reducing noise generation. Fluid flow through the central hole 42 is securely cut-off at engagement.

A fluid back pressure created in rebound cut-off region 46 hydraulically slows travel of the damper 10 as it approaches a full rebound condition. During this period of travel in the rebound cut-off mode, fluid expulsion from rebound cut-off region 46 is effected through small slots 45. The slots 45 act as a tunable flow restriction feature and can be sized for the particular application within which shock absorber 10 operates.

Figures 3, 5:
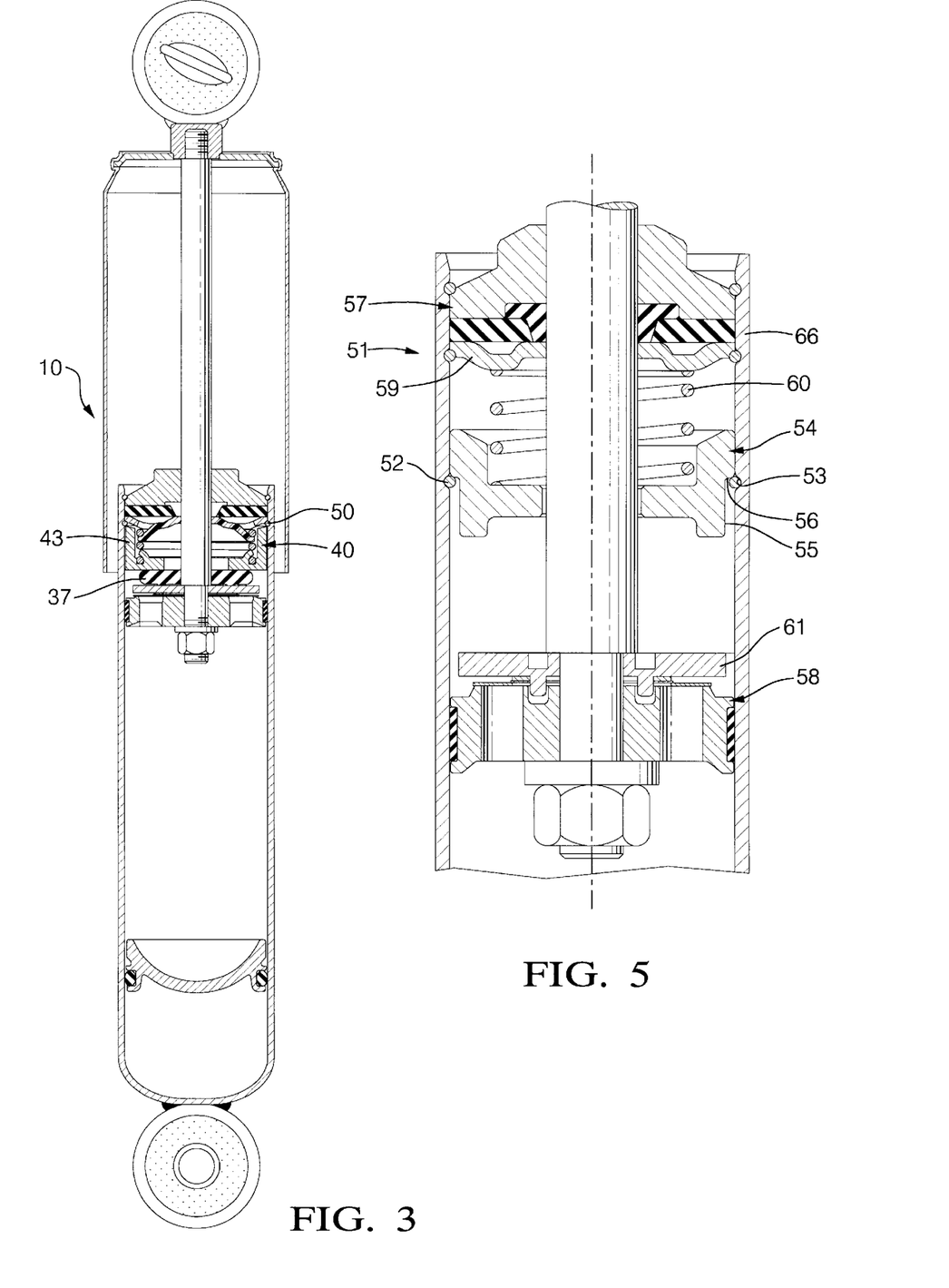
FIG. 3 is a fragmentary cross-sectional illustration of the suspension damper of FIG. 1 detailing positioning at the mechanical stop rebound limit.
FIG. 5 is a fragmentary cross sectional illustration of a suspension damper according to an alternative embodiment of the present invention.

Referring to FIG. 3, when the shock absorber 10 reaches the full rebound condition, the cylindrical wall 43 of rebound cut-off piston 40 engages the snap ring 50 positively limiting the extent of travel for the shock absorber 10. The abruptness of this mechanical stop is softened by compression of the bumper 37 which eases the full extension impact. When the shock absorber 10 subsequently enters an aggressive compression stroke, the cushioning element separates from the base wall 41 of the rebound cut-off piston 40 opening the central hole 42 since the bumper 37 is pressed onto piston rod 16. This ensures that no loads are generated by the rebound cut-off feature during operation of the shock absorber 10 in the compression direction.

In accordance with the foregoing description, a shock absorber 10 of the monotube gas charged type includes a competitive rebound cut-off feature with desirable operating characteristics and which does not unduly subtract from the active travel length of the system. Advantageously from a cost and manufacturing standpoint, relative few dimensions of components in the rebound cut-off feature are required to be made to exacting standards. The dimension of the outside diameter of the rebound cut-off piston 40 and the size of the small slots 45 are important. The remaining components of the rebound cut-off feature are manufactured to more liberal dimensional standards.

Figures 4, 6:
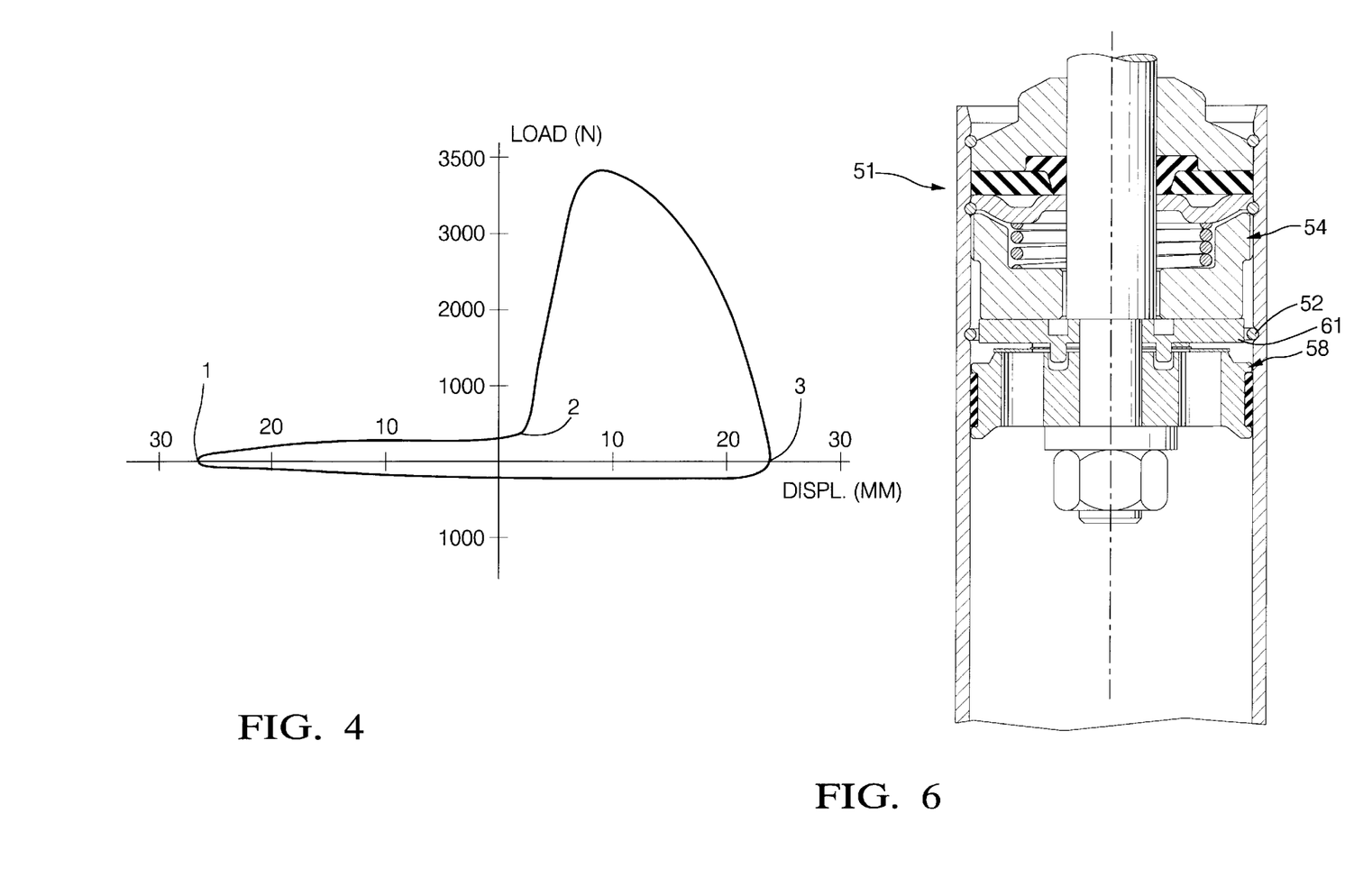
FIG. 4 is a performance curve illustrating advantageous operational features of a suspension damper according to the present invention.
FIG. 6 is a fragmentary cross sectional illustration of the suspension damper of FIG. 5 shown in a rebound travel limit position.

Referring to FIG. 4, operation of the shock absorber 10 under the influence of a sine wave input is represented by a force-displacement graph. The graph demonstrates the influence of rebound cut-off on force generation. Operation of the shock absorber 10 in an extension stroke is shown on the positive side of the displacement (horizontal), axis. Operation of the shock absorber 10 in moving between the illustrated positions of FIGS. 1 and 2 is indicated by the curve between points 1 and 2 on the graph. The amount of force generated during this segment of the curve is due to the damping piston assembly 15. Operation of the shock absorber 10 between the illustrated positions of FIGS. 2 and 3 is indicated by the curve between points 2 and 3 on the graph. The amount of force generated during this segment of the curve is due to the damping piston assembly 15 and the rebound cut-off feature. From point 3 back to point 1 on the graph, the shock absorber 10 has transitioned to a compression stroke with the force generated during this segment of the curve being attributable to the damping piston assembly 15 without the addition of any unwanted loads from the rebound cut-off feature.

Referring to FIGS. 5 and 6, an alternative embodiment of the present invention is illustrated. In this variation of the design, a snap ring 52 has been added which is received in groove 53 in the tube 66. The snap ring 52 limits downward movement of the rebound cut-off piston 54. To provide clearance in accommodating the snap ring, the rebound cut-off piston 54 includes a reduced diameter segment 55 leaving an annular shoulder 56 for engaging the snap ring 52. As evident, the rebound cut-off piston is not suspended from the rod guide assembly 57 but rather is simply biased toward the damping piston assembly 58. Advantageously, this eliminates the need for spring retaining elements on the flask 59 and on the rebound cut-off piston 54. In addition, the present embodiment enables preloading of the rebound cut-off piston with the spring 60. The preload maintains the rebound cut-off piston in position during operation of the shock absorber 51 outside the rebound cut-off mode. Additionally, as seen in FIG. 6, optional elimination of the cushioning element enables tighter compression of the rebound cut-off feature, maximizing active travel length. The disc stop 61 contacts the rebound cut-off piston 54 directly. It can also be seen that the snap ring 52 is strategically located so as to not interfere with operation of the damping piston assembly 58.

Figure 7:
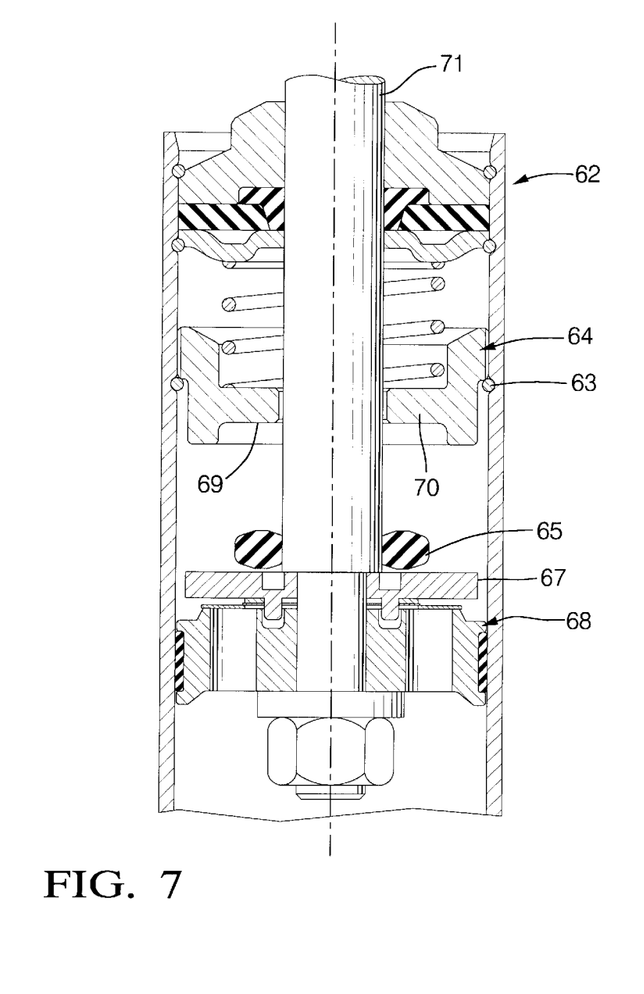
FIG. 7 is a fragmentary cross sectional illustration of a suspension damper according to another alternative embodiment of the present invention.
Figure 8:
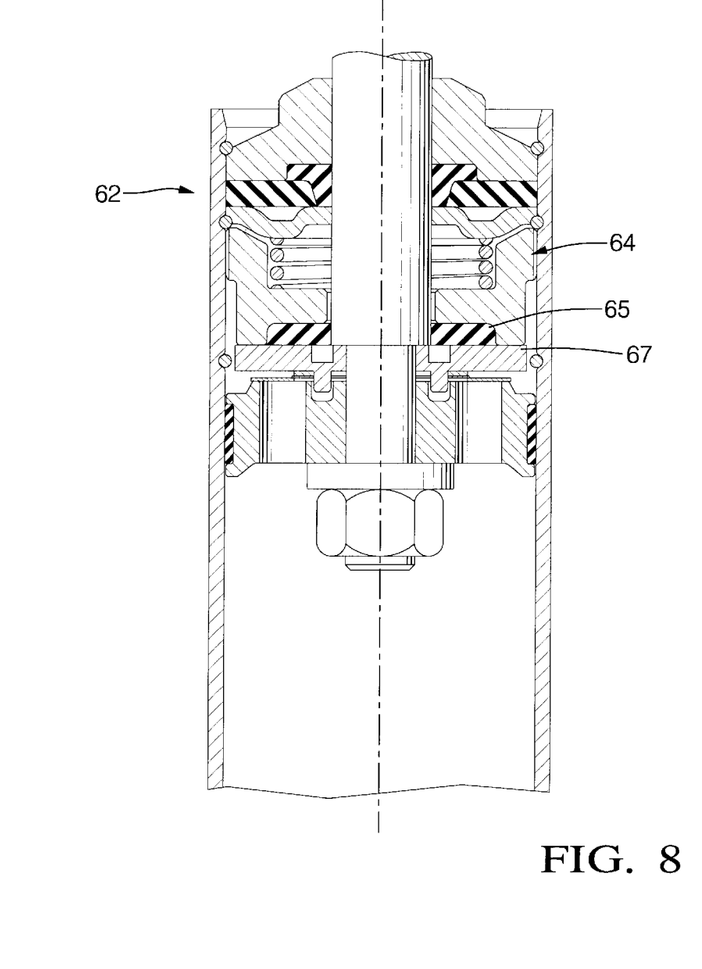
FIG. 8 is a fragmentary cross sectional illustration of the suspension damper of FIG. 7 shown in a rebound travel limit position.

Referring to FIGS. 7 and 8, another alternative embodiment of the present invention is illustrated. This embodiment is similar to the embodiment of FIGS. 5 and 6 in-that a snap ring 63 limits downward travel of rebound cut-off piston 64 within shock absorber 62. This design maintains maximum active travel length and includes a resilient cushioning element in the form of bumper 65, which is carried against disc stop 67 of damping piston assembly 68. Optionally, the cushioning element 65 is pressed into the rate cup 69 and carried by the rebound cut-off piston 64. The rebound cut-off piston 64 includes the integrated rate cup 69. In cooperation with the cushioning element 65, the rate cup 69 eases entry into the rebound cut-off mode and provides a soft impact stop upon full extension of the shock absorber 62. The rate cup 69 is formed as an annular groove in the base wall 70 about piston rod 71. When the shock absorber 62 reaches full rebound as shown in FIG. 8, the bumper 65 is compressed into the rate cup 69. Extension is mechanically limited in severe circumstances by contact between the disc stop 67 and the rebound cut-off piston 64. The rate cup 69 improves durability of the cushioning element 65 by containing radial pressure across the cushioning element's body within the rebound cut-off piston 64 in functioning of the rebound cut-off feature. Additionally, longitudinal space for the cushioning element 65 is provided in the rebound cut-off piston 64.

Advantageously, the rebound cut-off feature of the present invention is robust, operationally desirable and relatively competitively manufactured.

What is claimed is:

1. A suspension damper including a tube separated into extension and compression chambers by a slidable damping piston assembly with a rod guide assembly closing one end of the tube and a piston rod attached to the damping piston assembly and exiting the tube through the rod guide, the suspension damper comprising:

a rebound cut-off piston slidably carried in the tube between the rod guide assembly and the damping piston assembly and defining a rebound cut-off region between the rebound cut-off piston and the rod guide assembly and, the rebound cut-off piston having a center hole through which the piston rod travels with enough clearance to permit a substantially unrestricted fluid exchange through the center hole when the damping piston assembly is moved away from the rebound cut-off piston, wherein an outer periphery of the rebound cut-off piston is sized for a close slip-fit within the tube with a number of small slots extending longitudinally across the outer periphery and acting as restrictive and tunable flow control features when the suspension damper enters a rebound cut-off mode;

a spring separating the rebound cut-off piston from the rod guide assembly, wherein when the damping piston assembly comes into contact with the rebound cut-off piston, the rebound cut-off mode is entered and fluid flow is cut-off by blocking fluid flow through the center hole generating loads on the piston rod by a high fluid pressure generated in the rebound cut-off region, wherein fluid is restricted to exiting the rebound cut-off region via the small slots in the outer periphery of the damping piston assembly, wherein as fluid flow is restricted, the extension travel of the damper is slowed and is positively limited by mechanical engagement of the rebound cut-off piston with the rod guide assembly, wherein upon reaching full extension and transitioning to a compression stroke, the damping piston assembly separates from the rebound cut-off piston permitting substantially free flow through the center hole so that the rebound cut-off piston does not generate damping loads at the commencement of the compression stroke; and a snap ring fixed in the tube and limiting movement of the rebound cut-off piston away from the rod guide, wherein the rebound cut-off piston includes a reduced diameter segment providing radial clearance for the snap ring.

2. A suspension damper according to claim 1 further comprising a bumper cushioning element carried between the rebound cut-off piston and the damping piston assembly wherein the bumper cushioning element includes a protuberance.

3. A suspension damper including a tube separated into extension and compression chambers by a slidable damping piston assembly with a rod guide assembly closing one end of the tube and a piston rod attached to the damping piston assembly and exiting the tube through the rod guide, the suspension damper comprising:

a rebound cut-off piston slidably carried in the tube between the rod guide assembly and the damping piston assembly and defining a rebound cut-off region between the rebound cut-off piston and the rod guide assembly and, the rebound cut-off piston having a center hole through which the piston rod travels with enough clearance to permit a substantially unrestricted fluid exchange through the center hole when the damping piston assembly is moved away from the rebound cut-off piston, wherein an outer periphery of the rebound cut-off piston is sized for a close slip-fit within the tube with a number of small slots extending longitudinally across the outer periphery and acting as restrictive and tunable flow control features when the suspension damper enters a rebound cut-off mode;

a spring separating the rebound cut-off piston from the rod guide assembly, wherein when the damping piston assembly comes into contact with the rebound cut-off piston the rebound cut-off mode is entered and fluid flow is cut-off by blocking fluid flow through the center hole generating loads on the piston rod by a high fluid pressure generated in the rebound cut-off region, wherein fluid is restricted to exiting the rebound cut-off region via the small slots in the outer periphery of the damping piston assembly, wherein as fluid flow is restricted, the extension travel of the damper is slowed and is positively limited by mechanical engagement of the rebound cut-off piston with the rod guide assembly, wherein upon reaching full extension and transitioning to a compression stroke, the damping piston assembly separates from the rebound cut-off piston permitting substantially free flow through the center hole so that the rebound cut-off piston does not generate damping loads at the commencement of the compression stroke;

a bumper cushioning element carried between the rebound cut-off piston and the damping piston assembly wherein a rate cup groove is formed in the rebound cut-off piston and wherein when the damping piston assembly moves toward the rebound cut-off piston, the bumper cushioning element enters the rate cup groove.

4. A suspension damper comprising:

a tube separated into extension and compression chambers by a slidable damping piston assembly with a rod guide assembly closing one end of the tube and a piston rod attached to the damping piston assembly and exiting the tube through the rod guide;

a gas cup slidably carried in the tube and separating a compensation chamber from the compression chamber;

a rebound cut-off piston slidably carried in the tube between the rod guide assembly and the damping piston assembly and defining a rebound cut-off region between the rebound cut-off piston and the rod guide assembly and, the rebound cut-off piston having a center hole through which the piston rod travels with enough clearance to permit a substantially unrestricted fluid exchange through the center hole when the damping piston assembly is moved away from the rebound cut-off piston, wherein an outer periphery of the rebound cut-off piston is sized for a close slip-fit within the tube with a number of small slots extending longitudinally across the outer periphery and acting as restrictive and tunable flow control features when the suspension damper enters a rebound cut-off mode;

a spring separating the rebound cut-off piston from the rod guide assembly, wherein when the damping piston assembly comes into contact with the rebound cut-off piston, the rebound cut-off mode is entered and fluid flow is cut-off by blocking fluid flow through the center hole generating loads on the piston rod by a high fluid pressure generated in the rebound cut-off region, wherein fluid is restricted to exiting the rebound cut-off region via the small slots in the outer periphery of the damping piston assembly, wherein as fluid flow is restricted, the extension travel of the damper is slowed and is positively limited by mechanical engagement of the rebound cut-off piston with a snap ring of the rod guide assembly, wherein upon reaching full extension and transitioning to a compression stroke, the damping piston assembly separates from the rebound cut-off piston permitting substantially free flow through the center hole so that the rebound cut-off piston does not generate damping loads at the commencement of the compression stroke; and a snap ring fixed in the tube and limiting movement of the rebound cut-off piston away from the rod guide, wherein the rebound cut-off piston includes a reduced diameter segment providing radial clearance for the snap ring.

5. A suspension damper according to claim 4 further comprising a bumper cushioning element carried between the rebound cut-off piston and the damping piston assembly wherein the bumper cushioning element includes a plurality of knobs that are readily compressible.

6. A suspension damper comprising:

a tube separated into extension and compression chambers by a slidable damping piston assembly with a rod guide assembly closing one end of the tube and a piston rod attached to the damping piston assembly and exiting the tube through the rod guide;

a gas cup slidably carried in the tube and separating a compensation chamber from the compression chamber;

a rebound cut-off piston slidably carried in the tube between the rod guide assembly and the damping piston assembly and defining a rebound cut-off region between the rebound cut-off piston and the rod guide assembly and, the rebound cut-off piston having a center hole through which the piston rod travels with enough clearance to permit a substantially unrestricted fluid exchange through the center hole when the damping piston assembly is moved away from the rebound cut-off piston, wherein an outer periphery of the rebound cut-off piston is sized for a close slip-fit within the tube with a number of small slots extending longitudinally across the outer periphery and acting as restrictive and tunable flow control features when the suspension damper enters a rebound cut-off mode;

a spring separating the rebound cut-off piston from the rod guide assembly, wherein when the damping piston assembly comes into contact with the rebound cut-off piston, the rebound cut-off mode is entered and fluid flow is cut-off by blocking fluid flow through the center hole generating loads on the piston rod by a high fluid pressure generated in the rebound cut-off region, wherein fluid is restricted to exiting the rebound cut-off region via the small slots in the outer periphery of the damping piston assembly, wherein as fluid flow is restricted, the extension travel of the damper is slowed and is positively limited by mechanical engagement of the rebound cut-off piston with a snap ring of the rod guide assembly, wherein upon reaching full extension and transitioning to a compression stroke, the damping piston assembly separates from the rebound cut-off piston permitting substantially free flow through the center hole so that the rebound cut-off piston does not generate damping loads at the commencement of the compression stroke;

a bumper cushioning element carried between the rebound cut-off piston and the damping piston assembly wherein a rate cup groove is formed in the rebound cut-off piston and wherein when the damping piston assembly moves toward the rebound cut-off piston, the bumper cushioning element enters the rate cup groove.

7. A suspension damper comprising:

a tube separated into extension and compression chambers by a slidable damping piston assembly with a rod guide assembly closing one end of the tube and a piston rod attached to the damping piston assembly and exiting the tube through the rod guide;

a gas cup slidably carried in the tube and separating a compensation chamber from the compression chamber;

a rebound cut-off piston slidably carried in the tube between the rod guide assembly and the damping piston assembly and defining a rebound cut-off region between the rebound cut-off piston and the rod guide assembly and, the rebound cut-off piston having a center hole through which the piston rod travels with enough clearance to permit a substantially unrestricted fluid exchange through the center hole when the damping piston assembly is moved away from the rebound cut-off piston, wherein an outer periphery of the rebound cut-off piston is sized for a close slip-fit within the tube with a number of small slots extending longitudinally across the outer periphery and acting as restrictive and tunable flow control features when the suspension damper enters a rebound cut-off mode, and wherein the rebound cut-off piston includes a rate cup groove;

a bumper cushioning element carried between the rebound cut-off piston and the damping piston;

a spring separating the rebound cut-off piston from the rod guide assembly; and a snap ring fixed to the tube and limiting movement of the rebound cut-off piston away from the rod guide;

wherein when the damping piston assembly comes into contact with the rebound cut-off piston the bumper cushioning element enters the rate cup groove and the cut-off mode is entered wherein fluid flow is cut-off by the cushioning element operating to block fluid flow through the center hole generating loads on the piston rod by a high fluid pressure generated in the rebound cut-off region, wherein fluid is restricted to exiting the rebound cut-off region via the small slots in the outer periphery of the damping piston assembly, wherein as fluid flow is restricted, the extension travel of the damper is slowed and is positively limited by mechanical engagement of the rebound cut-off piston with the rod guide assembly, wherein upon reaching full extension and transitioning to a compression stroke, the damping piston assembly separates from the rebound cut-off piston permitting substantially free flow through the center hole so that the rebound cut-off piston does not generate damping loads at the commencement of the compression stroke.

8. A suspension damper including a tube separated into extension and compression chambers by a slidable damping piston assembly with a rod guide assembly closing one end of the tube and a piston rod attached to the damping piston assembly and exiting the tube through the rod guide, the suspension damper comprising:

a rebound cut-off piston slidably carried in the tube between the rod guide assembly and the damping piston assembly and defining a rebound cut-off region between the rebound cut-off piston and the rod guide assembly and, the rebound cut-off piston having an oversized hole through which the piston rod travels with enough clearance to permit fluid flow through the center hole when the damping piston assembly is moved away from the rebound cut-off piston, wherein an outer periphery of the rebound cut-off piston is sized for a close slip-fit within the tube;

a spring separating the rebound cut-off piston from the rod guide assembly, wherein when the damping piston assembly comes into contact with the rebound cut-off piston, the rebound cut-off mode is entered and fluid flow is cut-off by blocking fluid flow through the center hole generating loads on the piston rod by a high fluid pressure generated in the rebound cut-off region, wherein fluid is restricted to exiting the rebound cut-off region around the outer periphery of the damping piston assembly, wherein as fluid flow is restricted, the extension travel of the damper is slowed and is positively limited by mechanical engagement of the rebound cut-off piston with the rod guide assembly, wherein upon reaching full extension and transitioning to a compression stroke, the damping piston assembly separates from the rebound cut-off piston permitting substantially free flow through the center hole so that the rebound cut-off piston does not generate damping loads at the commencement of the compression stroke; and a snap ring fixed in the tube and limiting movement of the rebound cut-off piston away from the rod guide wherein the spring applies a preload to the rebound cut-off piston.

* * * * *